United States Patent [19]
Jones et al.

[11] Patent Number: 4,938,021
[45] Date of Patent: Jul. 3, 1990

[54] SUSTAINER PROPULSION SYSTEM

[75] Inventors: Anthony C. Jones; Henry A. Weber, both of San Diego, Calif.

[73] Assignee: Sundstrand Corporation, Rockford, Ill.

[21] Appl. No.: 263,397

[22] Filed: Oct. 27, 1988

[51] Int. Cl.$^5$ .............................................. F02K 3/10
[52] U.S. Cl. ...................................... 60/263; 60/270.1; 60/39.142; 244/53 B; 244/54; 244/55; 244/135 B
[58] Field of Search ............... 60/270.1, 263, 39.142, 60/243, 734; 244/54, 55, 53 A, 53 B, 74, 135 B, 135 R

[56] References Cited

U.S. PATENT DOCUMENTS

| | | | |
|---|---|---|---|
| 2,503,973 | 4/1950 | Smith | 244/74 |
| 2,936,973 | 5/1960 | Kappus | 60/263 |
| 2,977,753 | 4/1961 | Boulet | 60/270.1 |
| 3,112,903 | 12/1963 | Conrad | 60/270.1 |
| 3,143,852 | 8/1964 | Alderson | 60/270.1 |
| 3,313,500 | 4/1967 | Schmitt | 60/263 |
| 3,703,998 | 11/1972 | Girard | 244/135 B |
| 3,834,161 | 9/1974 | Quigley, Jr. et al. | 60/270.1 |
| 3,843,277 | 10/1974 | Ehrich . | |
| 3,917,117 | 11/1975 | Plotsky . | |
| 3,998,050 | 12/1976 | Curran | 60/270.1 |
| 4,096,803 | 6/1978 | Kesting | 60/270.1 |
| 4,192,336 | 3/1980 | Farquhar et al. . | |
| 4,434,621 | 3/1984 | Barbeau . | |
| 4,570,658 | 2/1986 | Dean et al. . | |
| 4,619,284 | 10/1986 | Delarue et al. . | |
| 4,674,286 | 6/1987 | Thatcher et al. . | |

Primary Examiner—Donald E. Stout
Attorney, Agent, or Firm—Wood, Phillips, Mason, Recktenwald & VanSanten

[57] ABSTRACT

The high cost of fabrication of a turbojet propulsion system 12 for a missile having an engine 18, mounted within a casing 14, including an inlet 20 to a compressor 22 and an exhaust gas outlet 24 is avoided in a structure having a propulsion system 12 with an inlet 26, 28; 37 located forward of the engine 18 for directing free stream air to the inlet 20 of the compressor 22, an outlet 30, 33; 38, 40 located aft of the engine 18 for directing exhaust gas into the free stream air, an engine starter 42 aft of the engine outlet 24, and a fuel storing bladder 46 forward of the engine 18.

27 Claims, 2 Drawing Sheets

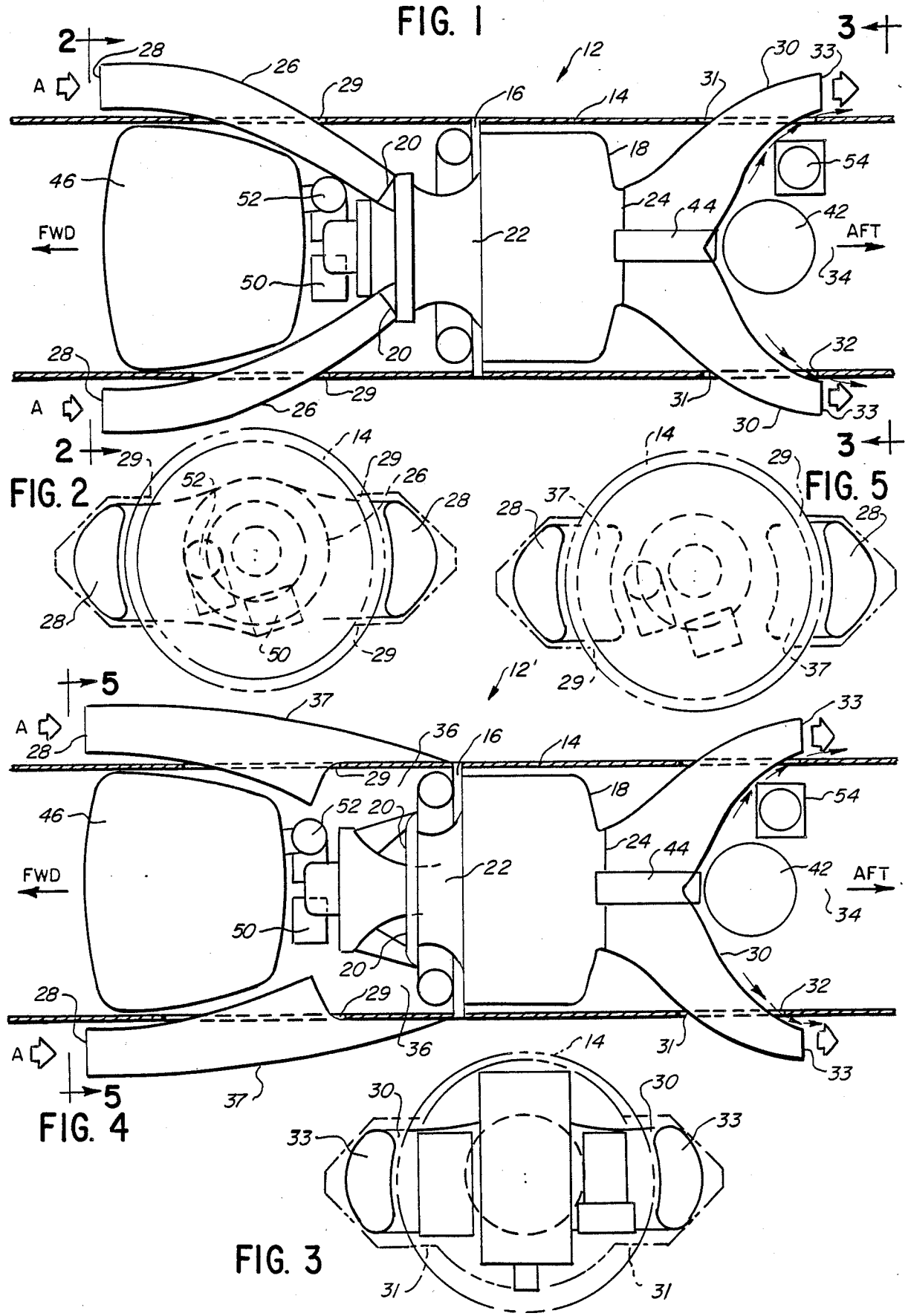

SUSTAINER PROPULSION SYSTEM

FIELD OF THE INVENTION

This invention relates to a propulsion system for a missile, and more specifically, to the particular arrangement of components therein.

BACKGROUND OF THE INVENTION

Historically, propulsion systems for small subsonic missiles have been limited to solid rocket engines at thrust levels under 100 lbs. The solid rocket engine has the attraction of being simple and low in cost, but has the disadvantages of high fuel consumption and lack of controllability. A small turbojet offers low fuel consumption and throttle control for hover, cruise and dash modes but has not found wide application due to its complexity and high manufacturing cost when compared to the solid propellant motor.

The present invention is directed to overcoming one or more of the above problems associated with a propulsion system including a turbojet engine.

SUMMARY OF THE INVENTION

It is the principle object of the invention to provide a new and improved propulsion system for a missile. More specifically, it is an object of the invention to provide a propulsion system wherein the arrangement of the inlet, fuel supply, turbojet engine, and exhaust contribute to a compact, superior performance, low production cost system.

An exemplary embodiment of the invention achieves the foregoing object in a propulsion system for a missile comprising a gas turbine engine including a housing mounted to a flange within a circular casing of the missile. The engine includes an air inlet to a compressor and an exhaust gas outlet. The system includes inlet means located forward of the engine for directing free stream air through the missile casing and into the compressor inlet, outlet means aft of the engine for directing engine exhaust gas through the missile casing and into free stream air, engine start means mounted aft of the engine outlet, fuel storing means mounted forward of the engine within the inlet means, fuel delivery means associated with the storing means for delivering fuel to the engine, and means for controlling and sequencing the engine.

In an exemplary embodiment of the invention, the inlet means comprises two curved ducts with forward facing scoops where the ducts direct free stream air through openings in the missile casing and into the compressor inlet of the engine. The ducts are attached to the circular casing such that the ducts are diametrically opposite to each other.

In an exemplary embodiment of the present invention, the two ducts are coupled directly to the compressor inlet.

In an alternate embodiment of the present invention, the propulsion system includes a plenum within the casing and forward of the compressor inlet. The two ducts terminate in the plenum, and the free stream air directed through the two ducts is dumped to the plenum ahead of the compressor inlet.

In an exemplary embodiment of the invention, the outlet means comprises a bifurcated duct coupled to the engine outlet, which passes through openings in the missile casing and terminates in two rearward facing nozzles.

In an alternate embodiment of the invention, the outlet means comprises a single duct, coupled to the engine outlet, which passes through an opening in the missile casing and terminates in a single rearward facing nozzle above the casing.

According to the invention, the engine start means comprises an insulated start cartridge mounted on a bracket supported by the missile casing aft of the engine outlet, and an ignitor mounted on the aft end of the engine housing.

According to the invention, the fuel storing means comprises a bladder tank mounted within the inlet means to a flange in the missile casing.

According to the invention, the fuel delivery means comprises a pressurization bottle mounted to the missile casing, a fuel pressure regulator, a pyrotechnically operated valve for directing fuel flow and providing zero leakage during storage, and a torque motor operated singlestage servo valve mounted on a missile casing supported bracket aft of the outlet means for scheduling engine fuel flow as a function of a signal from the control means.

Other objects and advantages will become apparent from the following specification taken in connection with the accompanying drawings.

DESCRIPTION OF THE DRAWINGS

FIG. 1 is a somewhat schematic, horizontal section of an exemplary embodiment of a propulsion system according to the invention;

FIG. 2 is a vertical section of the inlet configuration of the exemplary embodiment of the invention taken approximately along line 2—2 of FIG. 1;

FIG. 3 is a vertical section of the outlet configuration of the exemplary embodiment of the invention taken approximately along line 3—3 of FIG. 1;

FIG. 4 is a somewhat schematic, horizontal section of an alternate embodiment of a propulsion system;

FIG. 5 is a vertical section of the inlet configuration of the alternate taken approximately along line 5—5 of FIG. 4;

DESCRIPTION OF THE PREFERRED EMBODIMENT

Figure 6:
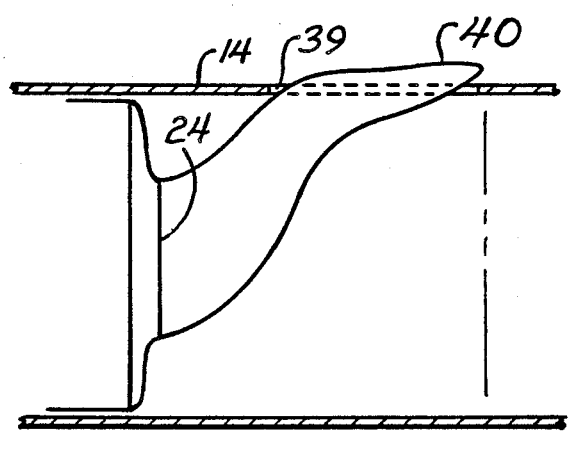
FIG. 6 is a somewhat schematic, vertical section of an alternate embodiment of the outlet of the propulsion system of the invention.

An exemplary embodiment of a propulsion system according to the invention, generally designated 12, is illustrated in FIG. 1. As shown therein, the propulsion system 12 is located in a cylindrical missile hull or casing 14 having a flange 16 to which is mounted an engine 18, more specifically, a turbojet engine. The engine 18 forms no part of the present invention but may be in the form of that disclosed in the commonly assigned copending application of Shekleton et al., Ser. No. 065,258, filed June 22, 1987, the details of which are herein incorporated by reference. The engine 18 includes an inlet 20 to a compressor 22 and an exhaust gas outlet 24.

As shown in FIG. 1, the propulsion system 12 includes inlet means located forward of the compressor inlet 20 for directing free stream air, generally designated A, through the circular casing 14 and into the compressor inlet 20.

In the embodiment of FIGS. 1 and 2, the inlet means is comprised of two diametrically opposite curved ducts 26 attached to the casing 14, and directly coupled to the inlet 20 of the compressor 22. For this particular application, the ducts 26 are composed of fiberglass reinforced plastic to minimize weight. The ducts 26 include forward facing scoops 28 which direct free stream air A through openings 29 in the casing 14 and directly into the inlet 20 of the compressor 22. In operation, the forward facing scoops 28 will be sized for optimum recovery of free stream air at a missile flight speed of approximately 150 m/s.

As shown in FIGS. 1 and 3, the exemplary embodiment of the propulsion system 12 further includes outlet means comprised of a bifurcated duct 30 passing through openings 31 in the casing 14. The bifurcated duct 30 is attached to and is completely supported at the rear of the engine 18. The openings 31 through which the duct 30 passes are appropriately sized to avoid contact between the duct 30 and the casing 14. Cooling air at ram pressure is admitted through holes in the engine mounting flange 16, then flows through the interior of the casing 14 and a compartment around the duct 30 to discharge through a space 32 between the duct 30 and the casing 14.

The bifurcated duct 30 terminates in two diametrically opposite rearward facing nozzles 33 which are typically inclined at an angle of approximately 10 degrees to the missile center line 34 to prevent direct impingement of hot exhaust gases onto the downstream body. The inclination will result in a actual thrust loss of only approximately 2%.

In an alternate embodiment of the propulsion system, generally designated 12', and as shown in FIGS. 4 and 5, the inlet means includes a plenum 36 within the casing 14 forward of the inlet 20 of the compressor 22 and opposed ducts 37. Unlike the embodiment of FIGS. 1 and 2, the two ducts 37 are not coupled directly to the compressor inlet 20 but, rather, terminate in the plenum 36 so that the free stream air A directed through the forward facing scoops 28 and the two ducts 37 is dumped to the plenum 36 ahead of the inlet 20 to the compressor 22.

Figure 7:
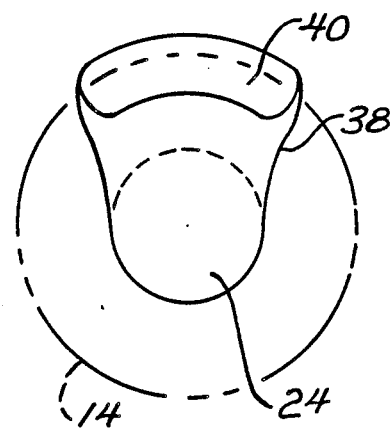
FIG. 7 is a rear elevation of the alternate embodiment of the outlet of the propulsion system of the invention.

In another alternate embodiment of the present invention, as shown in FIGS. 6 and 7, the outlet means may comprise a single duct 38 coupled to the engine outlet 24, rather than the bifurcated duct 30. As shown therein, the duct 38 passes through an opening 39 in the missile casing 14 and terminates in a rearward facing nozzle 40 located above the casing 14 so that the heat of exhaust gases is screened by the missile from ground based observers.

As shown in FIG. 1, the propulsion system 12 further includes engine start means, fuel storing means, and fuel delivery means. For the purpose of further describing these components, reference is made solely to the exemplary embodiment of FIG. 1 since these components are identical and similarly situated notwithstanding the particular configuration of the inlet and outlet means.

As shown in FIG. 1, the propulsion system 12 includes engine start means comprising a conventional start cartridge 42 centrally mounted on a casing supported bracket (not shown) aft of the engine outlet 24.

The start cartridge 42 is adequately insulated to maintain adjacent component and structure temperatures at required levels. Compartment cooling air flow removes heat during flight. The engine start means further comprises a conventional ignitor 44, which is mounted on the aft end of the engine housing, and causes the initial ignition of fuel during engine start.

Figure 8:
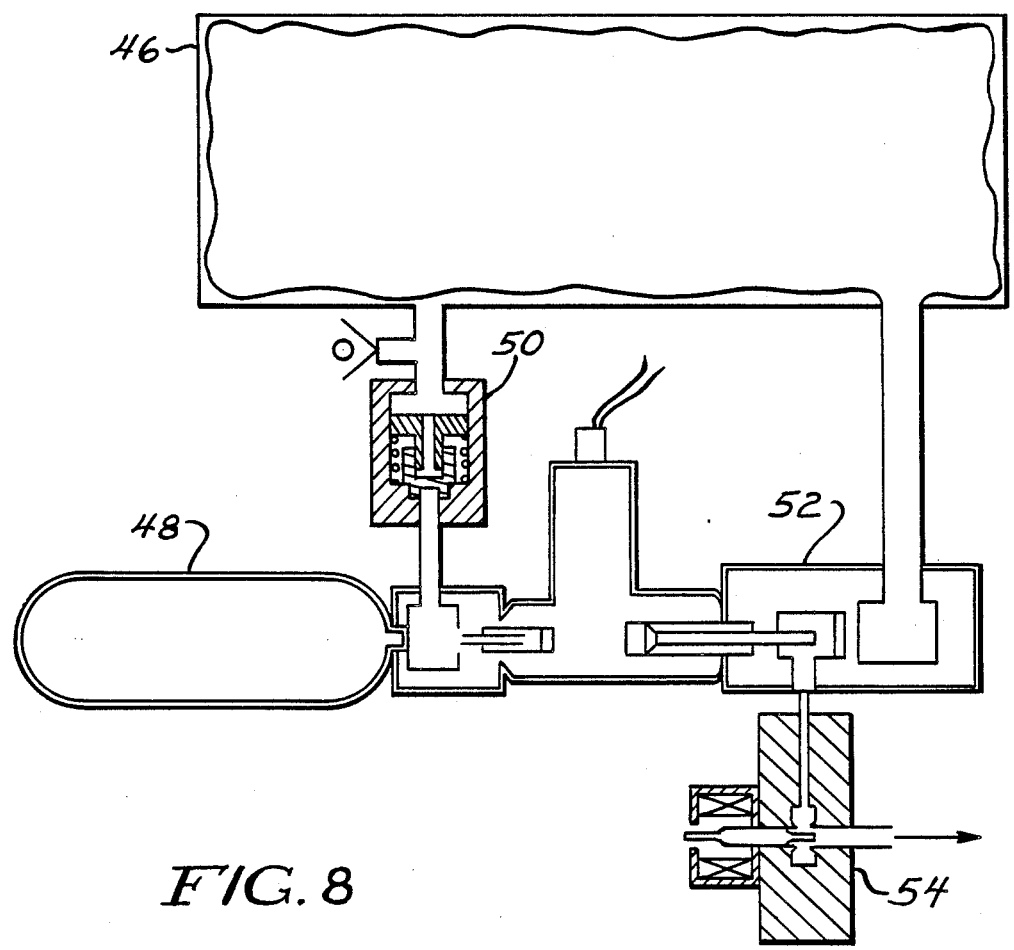
FIG. 8 is a schematic of the fuel delivery system of the propulsion system of the invention.

As shown in FIGS. 1 and 8, the propulsion system 12 further includes fuel storing means comprising a bladder tank 46 mounted in the forward end of the casing 14 between the inlet ducts 26.

Still further, the propulsion system 12 depicted in FIG. 1 includes fuel delivery means. As shown in FIG. 8, the fuel delivery means is comprised of a casing or engine mounted gas bottle 48 from which fuel pressure is derived. The gas bottle 48 is pressurized with nitrogen and is manufactured from aluminum with fiberglass filament winding to provide high strength and light weight. As shown in FIG. 8, the fuel delivery means additionally comprises a fuel pressure regulator 50, and a pyrotechnically operated valve assembly 52 for directing fuel flow and providing zero leakage during storage. As shown in FIG. 1, the pressure regulator 50 and the pyrotechnically operated valve 52 are both located in the forward end of the casing 14 between the inlet ducts 26 adjacent the bladder fuel tank 46. The pyrotechnically operated valve 52 is constructed of stainless steel and operates in a manner such that it causes a ram (not shown) to rupture an integral metal diaphragm (not shown) to permit the flow of fuel from the bladder fuel tank 46. Finally, the fuel delivery means comprises a fuel servo valve 54, located within the casing 14 aft of the engine outlet 24 and adjacent the start cartridge 42, which is conventionally used to schedule engine fuel flow as a function of a signal from a conventional control means (not shown). The fuel servo valve 54 is a single-stage, torque motor operated, flapper type valve and is insulated and/or shielded to maintain an acceptable temperature.

The fuel delivery means of the present invention provides for long term storage and rapid fuel system pressurization in any orientation. All components are self-contained to provide maximum reliability throughout all environmental conditions.

From the foregoing, it will be appreciated that the invention provides a propulsion system, incorporating a turbojet engine, wherein the various components are arranged to provide a compact, efficient propulsion system.

We claim:
1. A propulsion system for a missile comprising:
a gas turbine engine including a housing located within a circular casing of said missile, said engine including an air inlet to a compressor and an exhaust gas outlet from a turbine;
inlet means located forward of the engine for directing free stream air through the missile casing and into said compressor inlet;
outlet means aft of the engine for directing engine exhaust gas through the missile casing and into free stream air;
engine start means mounted aft of the engine outlet;
fuel storing means mounted forward of the engine within the inlet means;
fuel delivery means associated with said storing means for delivering fuel to the engine; and
means for controlling said engine.

2. The propulsion system of claim 1 wherein said engine is mounted to a flange within the casing of said missile.

3. The propulsion system of claim 1 wherein said inlet means comprises two curved ducts with forward facing scoops, said ducts directing free stream air through openings in the missile casing and into said compressor inlet of said engine.

4. The propulsion system of claim 3 further including a plenum within said casing and forward of said compressor inlet, said two ducts terminating in said plenum so that the free stream air directed through the two ducts is dumped to a plenum ahead of the compressor inlet.

5. The propulsion system of claim 3 wherein the two ducts are coupled directly to the compressor inlet.

6. The propulsion system of claim 3 wherein said ducts are attached to said circular casing such that said ducts are diametrically opposite to each other.

7. The propulsion system of claim 3 wherein said ducts are made of fiberglass reinforced plastic.

8. The propulsion system of claim 1 wherein said outlet means comprises a bifurcated duct coupled to the engine outlet, said bifurcated duct passing through openings in the missile casing and terminating in two rearward facing nozzles.

9. The propulsion system of claim 8 wherein said rearward facing nozzles of said bifurcated duct are diametrically opposite to each other.

10. The propulsion system of claim 1 wherein said outlet means comprises a single duct coupled to said engine outlet, said duct passing through an opening in said missile casing and terminating in a rearward facing nozzle above said casing.

11. The propulsion system of claim 1 wherein said engine start means comprises a start cartridge mounted aft of the engine outlet, and an ignitor mounted on the aft end of the engine housing.

12. The propulsion system of claim 11 wherein said start cartridge is insulated and mounted on a bracket supported by the missile casing.

13. The propulsion system of claim 1 wherein said fuel storing means comprises a bladder tank mounted within the inlet means to a flange in the missile casing.

14. The propulsion system of claim 1 wherein said fuel delivery means comprises a pressurization bottle mounted to the missile casing, a fuel pressure regulator, a pyrotechnically operated valve for directing fuel flow and providing zero leakage during storage, and a torque motor operated single-stage servo valve mounted on a missile casing supported bracket aft of the outlet means for scheduling engine fuel flow as a function of a signal from the control means.

15. A propulsion system for a missile comprising:
a gas turbine engine including a housing located within a circular casing of said missile, said engine including an air inlet to a compressor and an exhaust gas outlet from a turbine;
air inlet means extending forward of the engine, said inlet means passing through openings in the missile casing and terminating in forward facing scoops externally of said missile casing;
outlet means extending aft of the engine, said outlet means passing through an opening in the missile casing and terminating in a rearward facing nozzle externally of said missile casing;
engine start means mounted aft of the engine outlet;
fuel storing means mounted forward of the engine within the inlet means;
fuel delivery means associated with said storing means for delivering fuel to the engine; and
means for controlling said engine.

16. The propulsion system of claim 15 wherein said engine is mounted to a flange within the casing of said missile.

17. The propulsion system of claim 15 wherein said inlet means comprises two curved ducts with forward facing scoops, said ducts directing free stream air through said openings in the missile casing and into said compressor inlet of said engine.

18. The propulsion system of claim 17 further including a plenum within said casing and forward of said compressor inlet, said two ducts terminating in said plenum such that the free stream air directed through the two ducts is dumped to said plenum ahead of the compressor inlet.

19. The propulsion system of claim 17 wherein said two ducts are coupled directly to the compressor inlet.

20. The propulsion system of claim 17 wherein said ducts are attached to said circular casing such that said ducts are diametrically opposite to each other.

21. The propulsion system of claim 17 wherein said ducts are made of fiberglass reinforced plastic.

22. The propulsion system of claim 15 wherein said outlet means comprises a single duct coupled to said engine outlet, said duct directing engine exhaust from the engine outlet through the opening in the missile casing and through the rearward facing nozzle and into free stream air.

23. The propulsion system of claim 15 wherein said outlet means comprises a bifurcated duct, said bifurcated duct directing engine exhaust from the engine outlet through openings in the missile casing and through two rearward facing nozzles and into free stream air.

24. The propulsion system of claim 15 wherein said engine start means comprises a start cartridge mounted aft of the engine outlet, and an ignitor mounted on the aft end of the engine housing, said start cartridge being insulated and mounted on a bracket supported by the missile casing.

25. The propulsion system of claim 15 wherein said fuel storing means comprises a bladder tank mounted within the inlet means to a flange in the missile casing.

26. The propulsion system of claim 15 wherein said fuel delivery means comprises a pressurization bottle mounted to the missile casing, a fuel pressure regulator, a pyrotechnically operated valve for directing fuel flow and providing zero leakage during storage, and a torque motor operated single-stage servo valve mounted on a missile casing supported bracket aft of the outlet means for scheduling engine fuel flow as a function of a milliamp signal from the control means.

27. A propulsion system for a missile comprising:
a gas turbine engine including a housing mounted to a flange within a circular casing of said missile, said engine including an air inlet to a compressor and an exhaust gas outlet from a turbine;
air inlet ducts including forward facing scoops located forward of the engine for directing free stream air through openings in the missile casing and into a compressor inlet of said engine, said ducts being attached to said circular missile casing on opposite sides thereof;

an outlet bifurcated duct including two rearward facing nozzles located aft of the engine outlet for directing engine exhaust through openings in the missile casing and into free stream air;

an insulated start cartridge centrally mounted on a casing supported bracket aft of the bifurcated duct;

a pyrotechnic ignitor mounted on the aft end of the engine housing for causing initial ignition of fuel during engine start;

a bladder tank for storing fuel mounted forward of the engine inlet within the inlet ducts; and fuel delivery means comprising a fuel tank pressurization bottle mounted to the casing for deriving fuel pressure, a fuel pressure regulator, a pyrotechnically operated valve for directing the flow of fuel and providing zero leakage during storage, and a torque motor operated single-stage servo valve mounted on a casing supported bracket aft of the exhaust duct for scheduling fuel flow as a function of a signal from an engine control system.

* * * * *